(12) United States Patent
Micka et al.

(10) Patent No.: US 7,185,157 B2
(45) Date of Patent: *Feb. 27, 2007

(54) METHOD, SYSTEM, AND ARTICLE OF MANUFACTURE FOR GENERATING A COPY OF A FIRST AND A SECOND SET OF VOLUMES IN A THIRD SET OF VOLUMES

(75) Inventors: William Frank Micka, Tucson, AZ (US); Gail Andrea Spear, Tucson, AZ (US); Sam Clark Werner, Tucson, AZ (US); Warren K. Stanley, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 396 days.

This patent is subject to a terminal disclaimer.

(21) Appl. No.: 10/811,573

(22) Filed: Mar. 29, 2004

(65) Prior Publication Data

US 2005/0216681 A1 Sep. 29, 2005

(51) Int. Cl.
*G06F 12/00* (2006.01)
(52) U.S. Cl. .......................................... 711/162; 714/6
(58) Field of Classification Search ...................... None
See application file for complete search history.

(56) References Cited

U.S. PATENT DOCUMENTS

| | | | |
|---|---|---|---|
| 2003/0158869 A1* | 8/2003 | Micka | 707/203 |
| 2004/0230859 A1* | 11/2004 | Cochran et al. | 714/2 |
| 2005/0071372 A1* | 3/2005 | Bartfai et al. | 707/104.1 |
| 2005/0071710 A1* | 3/2005 | Micka et al. | 714/6 |
| 2005/0188251 A1* | 8/2005 | Benhase et al. | 714/6 |

* cited by examiner

*Primary Examiner*—Kevin Verbrugge
(74) *Attorney, Agent, or Firm*—Rabindranath Dutta; Konrad Raynes & Victor LLP

(57) ABSTRACT

Provided are a method, system, and article of manufacture for copying data. A request is received at a first storage control unit having a first set of volumes, wherein the first storage unit is coupled via a link to a second storage control unit having a second set of volumes that are peer-to-peer copies of the first set of volumes, and wherein the request is for generating a copy of the first and second set of volumes in a third set of volumes in the second storage control unit. A command is transmitted via the link, from the first storage control unit to the second storage control unit, wherein the transmitted command is capable of causing the second storage control unit to generate the copy of the first and second set of volumes in the third set of volumes in the second storage control unit.

18 Claims, 5 Drawing Sheets

METHOD, SYSTEM, AND ARTICLE OF MANUFACTURE FOR GENERATING A COPY OF A FIRST AND A SECOND SET OF VOLUMES IN A THIRD SET OF VOLUMES

BACKGROUND

1. Field

The disclosure relates to a method, system, and article of manufacture for copying of data in a remote storage unit.

2. Background

Information technology systems, including storage systems, may need protection from site disasters or outages, where outages may be planned or unplanned. Furthermore, information technology systems may require features for data migration, data backup, or data duplication. Implementations for disaster or outage recovery, data migration, data backup, and data duplication may include mirroring or copying of data in storage systems. Such mirroring or copying of data may involve interactions among hosts, storage systems and connecting networking components of the information technology system.

An enterprise storage server (ESS), such as the IBM* TotalStorage Enterprise Storage Server*, may be a disk storage server that includes one or more processors coupled to storage devices, including high capacity scalable storage devices, Redundant Array of Independent Disks (RAID), etc. The enterprise storage servers are connected to a network and include features for copying data in storage systems.

*IBM, IBM TotalStorage Enterprise Storage Server, Enterprise System Connection (ESCON), OS/390, Peer to Peer Remote Copy (PPRC), FlashCopy are trademarks of International Business Machines Corp.

Enterprise storage servers may include copy functions for copying data either locally, i.e., within the same on-site ESS, or remotely, i.e., copying data to a separate remote-site ESS. The copy functions can be classified as either dynamic or point-in-time copy functions. Dynamic copy functions constantly update the secondary copy as applications make changes to the primary data source. Point-in-time copying techniques provide an instantaneous copy or view of what the original data looked like at a specific point in time.

In certain enterprise storage servers there may be copy functions, such as, FlashCopy*, that provide a point-in-time copy of the data. Implementations may copy data between a set of local/source volumes and a corresponding set of remote/target volumes in enterprise storage servers. Flash-Copy may provide a point-in-time copy for ESS volumes by creating a physical point-in-time copy of the data, with minimal interruption to applications, and make it possible to access both the source and target copies substantially immediately. Both the source and the target volumes reside on the same ESS system, although implementations may be possible where the source and target volumes reside on different ESS systems.

*IBM, IBM Total Storage Enterprise Storage Server, Enterprise System Connection (ESCON), OS/390, Peer to Peer Remote Copy (PPRC), Flash-Copy are trademarks of International Bussiness Machines Corp.

Peer-to-Peer Remote Copy (PPRC) is an ESS function that allows the shadowing of application system data from a first site to a second site. The first site may be referred to as an application site, a local site, or a primary site. The second site may be referred to as a recovery site, a remote site, or a secondary site. The logical volumes that hold the data in the ESS at the local site are called local volumes, and the corresponding logical volumes that hold the mirrored data at the remote site are called remote volumes. High speed links may connect the local and remote ESS systems.

In the synchronous type of operation for PPRC, i.e., synchronous PPRC, the updates done to the local volumes at the local site are synchronously shadowed onto the remote volumes at the remote site. As synchronous PPRC is a synchronous copying solution, write updates are ensured on both copies (local and remote) before the write is considered to be completed for the application. In synchronous PPRC the application does not get the "write complete" condition until the update is synchronously done in both the local and the remote volumes. Therefore, from the application perspective the data at the remote volumes at the remote site is real time data always consistent with the data at the local volumes.

SUMMARY OF THE DESCRIBED EMBODIMENTS

Provided are a method, system, and article of manufacture for copying data. A request is received at a first storage control unit having a first set of volumes, wherein the first storage unit is coupled via a link to a second storage control unit having a second set of volumes that are peer-to-peer copies of the first set of volumes, and wherein the request is for generating a copy of the first and second set of volumes in a third set of volumes in the second storage control unit. A command is transmitted via the link, from the first storage control unit to the second storage control unit, wherein the transmitted command is capable of causing the second storage control unit to generate the copy of the first and second set of volumes in the third set of volumes in the second storage control unit.

In certain additional embodiments, the second set of volumes are copied to the third set of volume in the second storage control unit, wherein the copy is consistent at a point in time. In certain additional embodiments, copying the second set of volumes to the third set of volumes is performed by a point-in-time copy operation.

In further embodiments, the second storage control unit does not have an active link for receiving commands from a device other than the first storage control unit. In yet additional embodiments, synchronous peer-to-peer copies of the first set of volumes are generated to the second set of volumes.

In yet additional embodiments, the request is a FlashCopy command including an indicator that indicates that a Flash-Copy operation is to be performed remotely from the first storage control unit, and wherein the FlashCopy command is received from a host coupled to the first storage control unit. The host is signaled that the copy has been generated.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Figure 1:
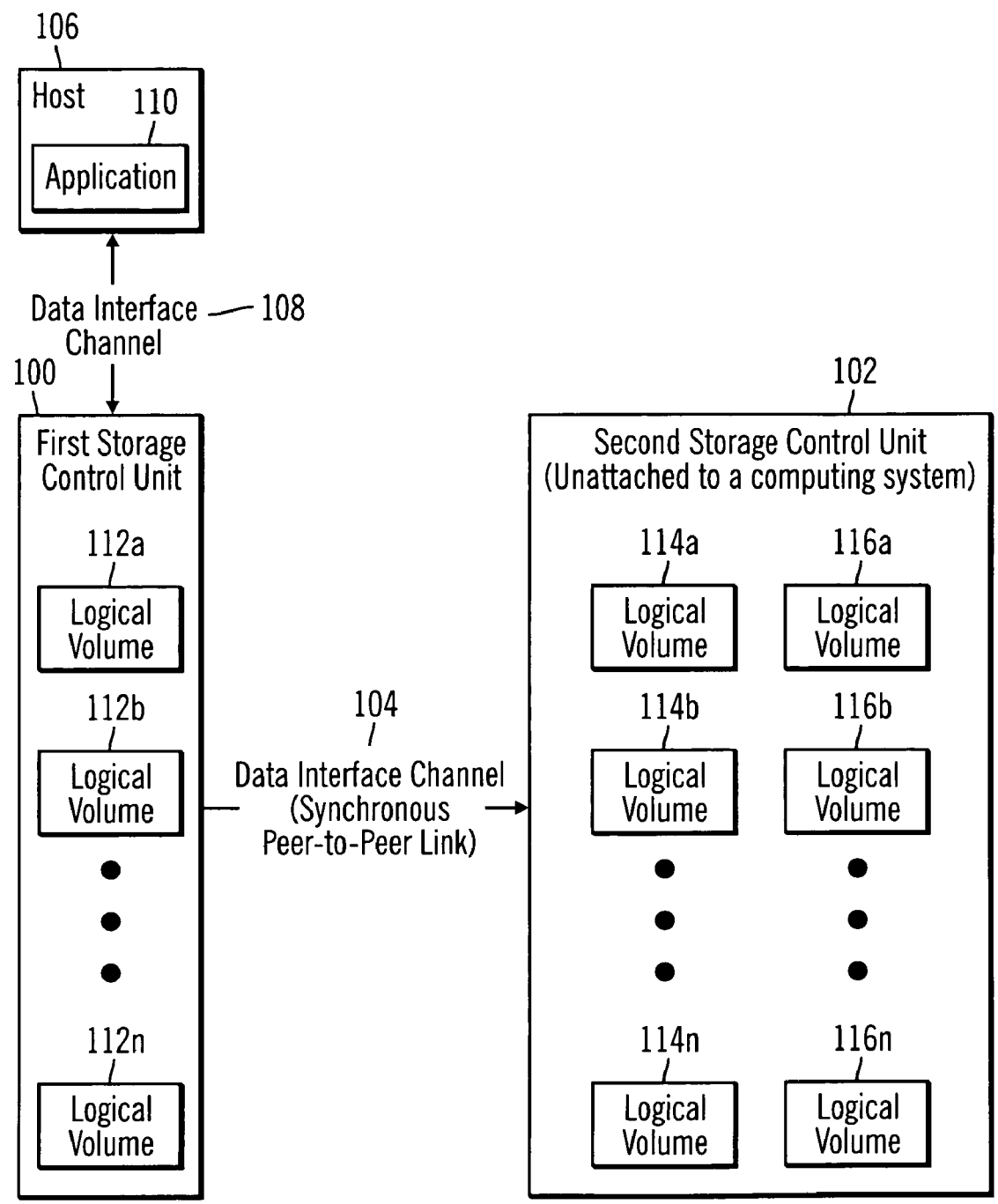
FIG. 1 illustrates a computing environment, in accordance with certain embodiments.

FIG. 1 illustrates a computing environment utilizing two storage control units, such as, a first storage control unit 100 and a second storage control unit 102, connected by a data interface channel 104, such as, the Enterprise System Connection (ESCON)* channel or any other data interface mechanism known in the art (e.g., fibre channel, Storage Area Network (SAN) interconnections, etc.). The data interface channel 104 may form a peer-to-peer link that allows transfer of data between the first storage control unit 100 and the second storage control unit 102.

*IBM, IBM TotalStorage Enterprise Storage Server, Enterprise System Connection (ESCON), OS/390, Peer to Peer Remote Copy (PPRC), FlashCopy are trademarks of International Business Machines Corp.

The two storage control units 100, 102 may be at two different sites that are within a synchronous communication distance of each other. The synchronous communication distance between two storage control units is the distance up to which synchronous communication is feasible between the two storage control units. Data may be synchronously copied from the first storage control unit 100 to the second storage control unit 102 via the data interface channel 104, i.e. a peer-to-peer copy relationship may exist between the first storage control unit 100 and the second storage control unit 102. In certain alternative embodiments, there may be more than two storage control units and mechanisms different from synchronous peer-to-peer copy may be used to copy data from the first storage control unit 100 to the second storage control unit 102. Furthermore, functions of a plurality of storage control units may be integrated into a single storage control unit, e.g., functions of the first storage control unit 100 and the second storage control unit 102 may be integrated into a single storage control unit.

The first storage control unit 100 is coupled to a host 106 via a data interface channel 108. While only a single host 106 is shown coupled to the first storage control unit 100, in certain embodiments, a plurality of hosts may be coupled to the first storage control unit 100. The host 106 may be any computational device known in the art, such as a personal computer, a workstation, a server, a mainframe, a hand held computer, a palm top computer, a telephony device, network appliance, etc. The host 106 may include any operating system (not shown) known in the art, such as the IBM OS/390* operating system. The host 106 may include at least one host application 110 that sends Input/Output (I/O) requests and other commands to the first storage control unit 100 over the data interface channel 108.

*IBM, IBM TotalStorage Enterprise Storage Server, Enterprise System Connection (ESCON), OS/390, Peer to Peer Remote Copy (PPRC), FlashCopy are trademarks of International Business Machines Corp.

Unlike the first storage control unit 100 that is coupled to the host 106, the second storage control unit 102 is not coupled to any host. In certain embodiments, the second storage control unit 102 does not have system attachments to any computational device. Therefore, the resources and cost associated with data interface channels beyond the data interface channel 104 is absent for the second storage control unit 102.

The storage control units 100, 102 may comprise logical volumes, where a logical volume may correspond to a physical storage volume. The physical storage volumes (not shown) may be configured as a Direct Access Storage Device (DASD), one or more RAID ranks, Just a bunch of disks (JBOD), or any other data repository system known in the art. For example, in certain embodiments the first storage control unit 100 may comprise logical volumes 112a . . . 112n, and the second storage control unit may comprise logical volumes 114a . . . 114n, 116a . . . 116n.

Therefore, FIG. 1, illustrates a computing environment where an application 110 sends a command to a first storage control unit 100 over the data interface channel 108. The first storage control unit 100 synchronously copies data from the first storage control unit 100 to the second storage control unit 102 in via a peer-to-peer mechanism over the data interface channel 104. On receipt of the command from the application, the first storage control unit 100 may direct the second storage control unit 102 to perform a FlashCopy in the second storage control unit 102.

Figure 2:
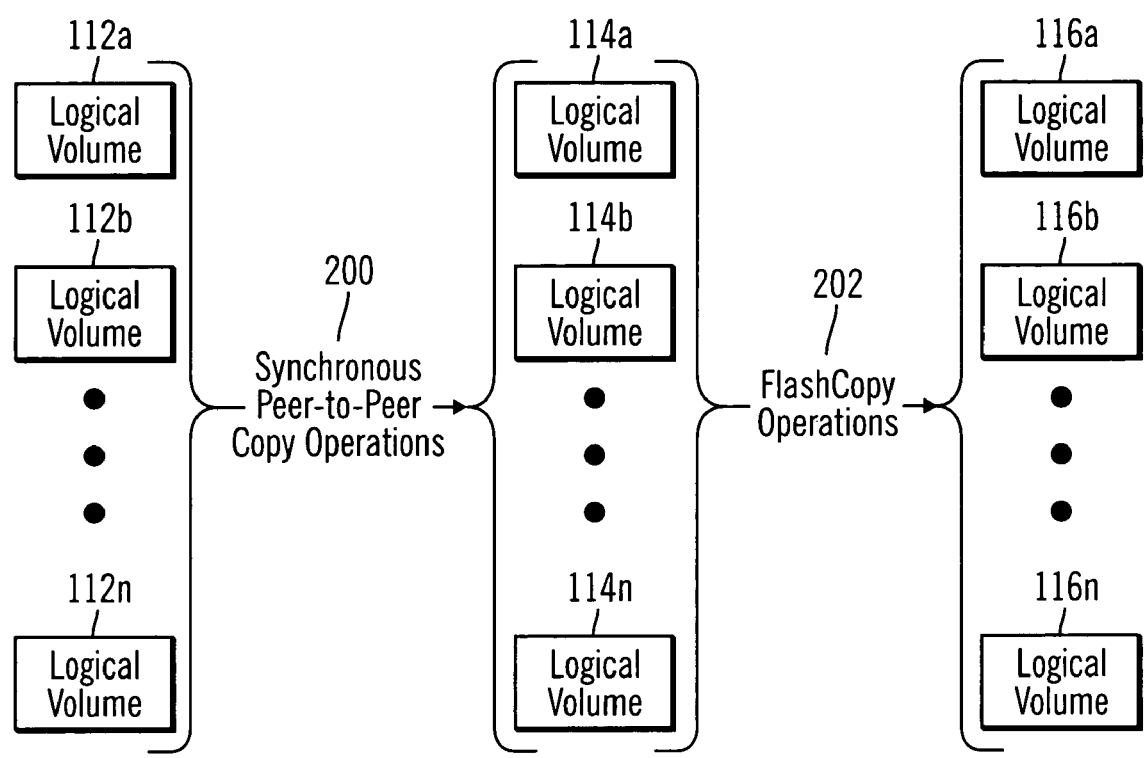
FIG. 2 illustrates how logical volumes are copied, in accordance with certain embodiments.

FIG. 2 illustrates how logical volumes are copied from the first storage control unit 100 to the second storage control unit 102 and within the second storage control unit 102, in accordance with certain embodiments.

In certain embodiments, data in the logical volumes 112a . . . 112n in the first storage control unit 100 are copied via synchronous peer-to-peer copy operations 200 to the logical volumes 114a . . . 114n in the second storage control unit 102. For example, data in the logical volume 112a in the first storage control unit 100 is synchronously copied to the corresponding logical volume 114a in the second storage control unit 102, data in the logical volume 112b in the first storage control unit 100 is synchronously copied to the corresponding logical volume 114b in the second storage control unit 102, and data in the logical volume 112n in the first storage control unit 100 is synchronously copied to the corresponding logical volume 114n in the second storage control unit 102. The synchronous copying of the logical volumes 112a . . . 112n to the logical volumes 114a . . . 114n may be performed via a variety of techniques, including synchronous PPRC.

In certain embodiments, data in the logical volumes 114a . . . 114n in the second storage control unit 102 are copied via FlashCopy operations 202 to the logical volumes 116a . . . 116n in the second storage control unit 102. For example, data in the logical volume 114a in the second storage control unit 102 is copied via a FlashCopy operation to the corresponding logical volume 116a in the second storage control unit 102, data in the logical volume 114b in the second storage control unit 102 is copied via a Flash-Copy operation to the corresponding logical volume 116b in the second storage control unit 102, and data in the logical volume 114n in the second storage control unit 102 is copied via a FlashCopy operation to the corresponding logical volume 116n in the second storage control unit 102. At the conclusion of the FlashCopy operations 202 data in the logical volumes 116a . . . 116n are consistent at a point in time with data in the logical volumes 112a . . . 112n and logical volumes 114a . . . 114n. Although, the embodiments use FlashCopy operations 202, other types of copy operations besides FlashCopy may also be used. Certain embodiments do not require the creation of a consistent copy of data. Additionally, in certain embodiments, consistency may be achieved by using the "Freeze" option of FlashCopy.

Therefore, FIG. 2 illustrates how data is copied from the first storage control unit 100 to the second storage control unit via synchronous PPRC and how a second copy is made of the copied data in the second storage control unit via FlashCopy, such that, the data in the first and second storage control units 100, 102 are consistent at a point in time at the conclusion of the FlashCopy operations 202. In certain embodiments, the synchronous peer-to-peer copy operations 200 may comprise a single or a plurality of operations, and the FlashCopy operations 202 may comprise a single or a plurality of operations.

Figure 3:
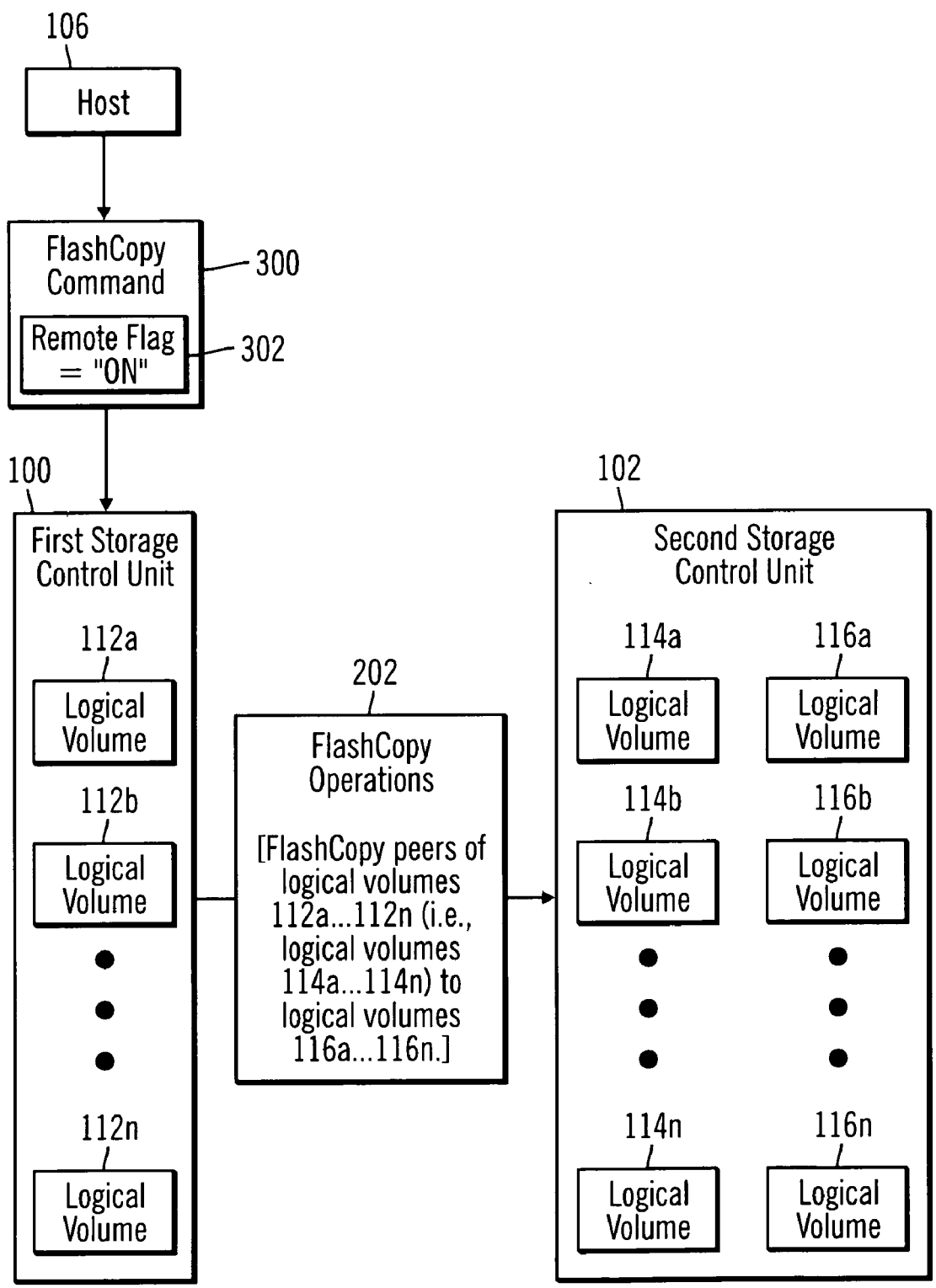
FIG. 3 illustrates how a FlashCopy command is transmitted from a host to first storage control unit for performing FlashCopy operations in a second storage control unit, in accordance with certain embodiments.

FIG. 3 illustrates how a FlashCopy command 300 is transmitted from the host 106 to the first storage control unit 100 for performing FlashCopy operations 202 in the second storage control unit 102, in accordance with certain embodiments.

In certain embodiments, the host 106 may send at least one FlashCopy command 300 to the first storage control unit 100. The FlashCopy command 300 may include a remote flag 302, where the remote flag 302 is an indicator that indicates whether the FlashCopy command is to be executed remotely from the first storage control unit 100. For example, in certain embodiments if the remote flag 302 is "ON" then the FlashCopy command 300 may not be executed locally in the first storage control unit 100 but is forwarded by the first storage control unit 100 to a remote storage control unit, such as, the second storage control unit 102, for execution. In certain embodiments, the FlashCopy command 300 may be generated by the application 110 that runs in the host 106. A user or an application that has a need to create a copy of the logical volumes 114a . . . 114n in the second storage control unit 102 may generate the FlashCopy command 300 to the first storage control unit 100. As the second storage control unit 102 does not have system attachments that allow a host to directly communicate with the second storage control unit 102, the embodiments allow the host 106 to communicate with the second storage control unit 102 via the first storage control unit 100 and the data interface channel 104.

On receiving the FlashCopy command 300 with the remote flag 302 being "ON", the first storage control unit 100 sends FlashCopy operations 202 to the second storage control unit 202. The FlashCopy operations 202 perform a FlashCopy of peers of logical volumes 112a . . . 112n, i.e., logical volumes 114a . . . 114n, to the logical volumes 116a . . . 116b. At the conclusion of the FlashCopy operations 202, the logical volumes 116a . . . 116n are consistent at a point in time with the logical volumes 112a . . . 112n and 114a . . . 114n.

Therefore, FIG. 3 illustrates how point-in-time copies are made in the second storage control unit 102 that has no additional system attachments except for the data interface channel 104 to the first storage control unit 100.

Figure 4:
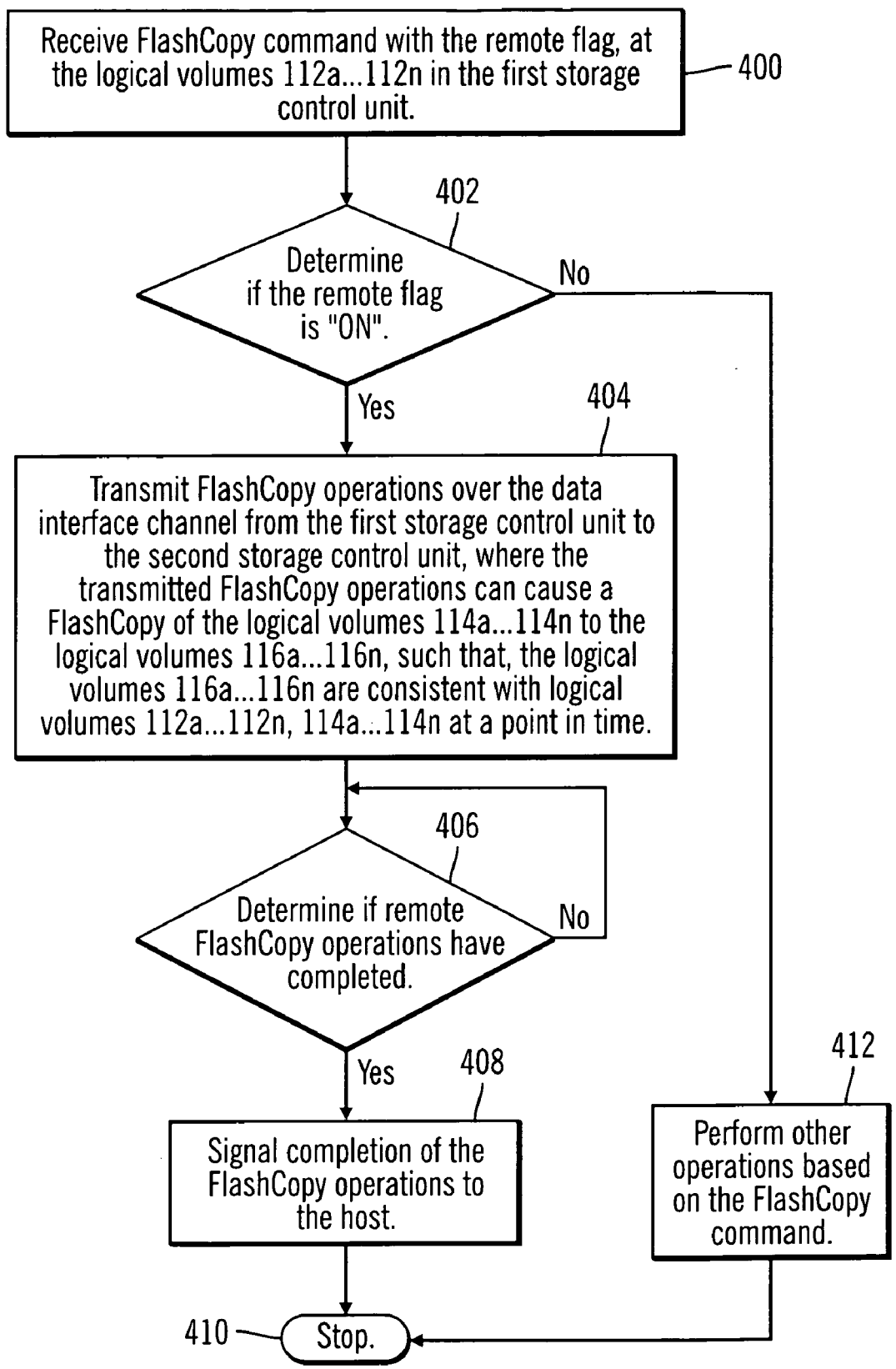
FIG. 4 illustrates logic for consistent copying of data, in accordance with certain embodiments.

FIG. 4 illustrates logic for consistent copying of data implemented via the storage control units 100, 102, in accordance with certain embodiments.

Control starts at block 400, where the logical volumes 112a . . . 112n in the first storage control unit 100 receive the FlashCopy command 300 with the remote flag 302. The first storage control unit 402 determines (at block 402) if the remote flag 302 is "ON". In certain embodiments the logic of receiving the FlashCopy command 300 (at block 400) and the determination (at block 402) of whether the remote flag 302 is "ON" and certain subsequent operations may be performed by an application implemented in the first storage control unit 100, or via hardware or firmware in the first storage control unit 100.

If the first storage control unit 402 determines that the remote flag 302 is "ON", i.e., the FlashCopy command 300 is to be executed at a remote storage control unit, then the first storage control unit 100 transmits (at block 404) the FlashCopy operations 202 to the second storage control unit 102 that is located remotely from the first storage control unit 100. The transmission over the FlashCopy operations 202 takes place over the data interface channel 104 that couples the first storage control unit 100 to the second storage control unit 102. In certain embodiments, the transmitted FlashCopy operations 202 can cause a FlashCopy of the logical volumes 114a . . . 114n in the second storage control unit 102 to the logical volumes 116a . . . 116n in the second storage control unit 102, such that the logical volumes 116a . . . 116n are consistent with logical volumes 112a . . . 112n, 114a . . . 114n at a point in time.

The first storage control unit 100 determines (at block 406) whether the remote FlashCopy operations 202 have completed. Prior to determining at the first storage unit 100 whether the remote FlashCopy operations 202 have completed, the first storage control unit 100 may receive corresponding completion signals from the second storage control unit 102, where the completion signals from the second storage control unit 102 may indicate the completion of the FlashCopy operations 202 at the second storage control unit 102.

If the first storage control unit 100 determines (at block 406) that the remote FlashCopy operations 202 have completed, then the first storage control unit signals (at block 406) the completion of the FlashCopy operations 202 to the host 106 and the control stops (at block 410).

If the first storage control unit 100 determines (at block 406) that the remote FlashCopy operations 202 are incomplete, then the first storage control unit 100 again determines (at block 406) whether the remote FlashCopy operations 202 have completed.

If the first storage control unit 402 determines (at block 402) that the remote flag 302 is not "ON", i.e., the Flash-Copy command 300 is not to be executed at a remote storage control unit, then the first storage control unit 100 may perform (at block 412) other operations locally at the first storage control unit 100 based on the FlashCopy command 300 and the control stops (at block 410).

Therefore, FIG. 4 illustrates certain embodiments in which the first storage control unit 100 communicates commands for performing FlashCopy operations to a second storage control unit 102 that is in a peer-to-peer copy relationship with the first storage control unit 100. The commands are communicated from the first storage control unit 100 over the already existing data interface channel 104 that couples the first storage control unit 100 to the second storage control unit 102.

Certain embodiments allow customers and users, who have the need to communicate with the logical volumes 114a . . . 114n in the second storage control unit 102, the ability to create a safety copy of the logical volumes 114a . . . 114n in the logical volumes 116a . . . 116n. The safety copy of the logical volumes 116a . . . 116n are consistent at a point-in-time with the logical volumes 112a . . . 112n, 114a . . . 114n. The second storage control unit 102 does not require an active host system connection and receives the commands for generating the safety copy over an existing link with the first storage control unit 100. In many situations, customers and users may bear additional expenses for extra communication links. Therefore, potential resources and potential costs associated with system attachments beyond the data interface channel 104 are saved. Furthermore, there is no need for extra operating system licenses because no hosts are directly attached to the second storage control unit 102.

Additionally, in certain embodiments, such as system 390 based embodiments where the host 106 runs the OS/390 operating system, there may be a limit on the number of volume addresses that can be addressed by the host 106. If the host 106 were configured to connect directly to both the first storage control unit 100 and the second storage control unit 102 then the host 106 would have to address both the logical volumes 112a . . . 112n and the logical volumes 114a . . . 114n. In certain embodiments, since the host 106 is coupled to only one storage control unit the number of logical volumes addressed by the host 106 is potentially halved. As a result, the limited number of volume addresses may be used more effectively by the host 106.

Furthermore, the embodiments allow the logical volumes 116a . . . 116n to be consistent at a point-in-time with the logical volumes 112a . . . 112n, 114a . . . 114n. Therefore, users and customers may use the logical volumes 116a . . . 116n for performing various operations, with the guarantee that the logical volumes 116a . . . 116n are consistent at a point-in-time with the logical volumes 112a . . . 112n, 114a . . . 114n.

Additional Embodiment Details

The described techniques may be implemented as a method, apparatus or article of manufacture involving software, firmware, micro-code, hardware and/or any combination thereof. The term "article of manufacture" as used herein refers to program instructions, code and/or logic implemented in circuitry (e.g., an integrated circuit chip, Programmable Gate Array (PGA), ASIC, etc.) and/or a computer readable medium (e.g., magnetic storage medium, such as hard disk drive, floppy disk, tape), optical storage (e.g., CD-ROM, DVD-ROM, optical disk, etc.), volatile and non-volatile memory device (e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.). Code in the computer readable medium may be accessed and executed by a machine, such as, a processor. In certain embodiments, the code in which embodiments are made may further be accessible through a transmission medium or from a file server via a network. In such cases, the article of manufacture in which the code is implemented may comprise a transmission medium, such as a network transmission line, wireless transmission media, signals propagating through space, radio waves, infrared signals, etc. Of course, those skilled in the art will recognize that many modifications may be made without departing from the scope of the embodiments, and that the article of manufacture may comprise any information bearing medium known in the art. For example, the article of manufacture comprises a storage medium having stored therein instructions that when executed by a machine results in operations being performed.

Figure 5:
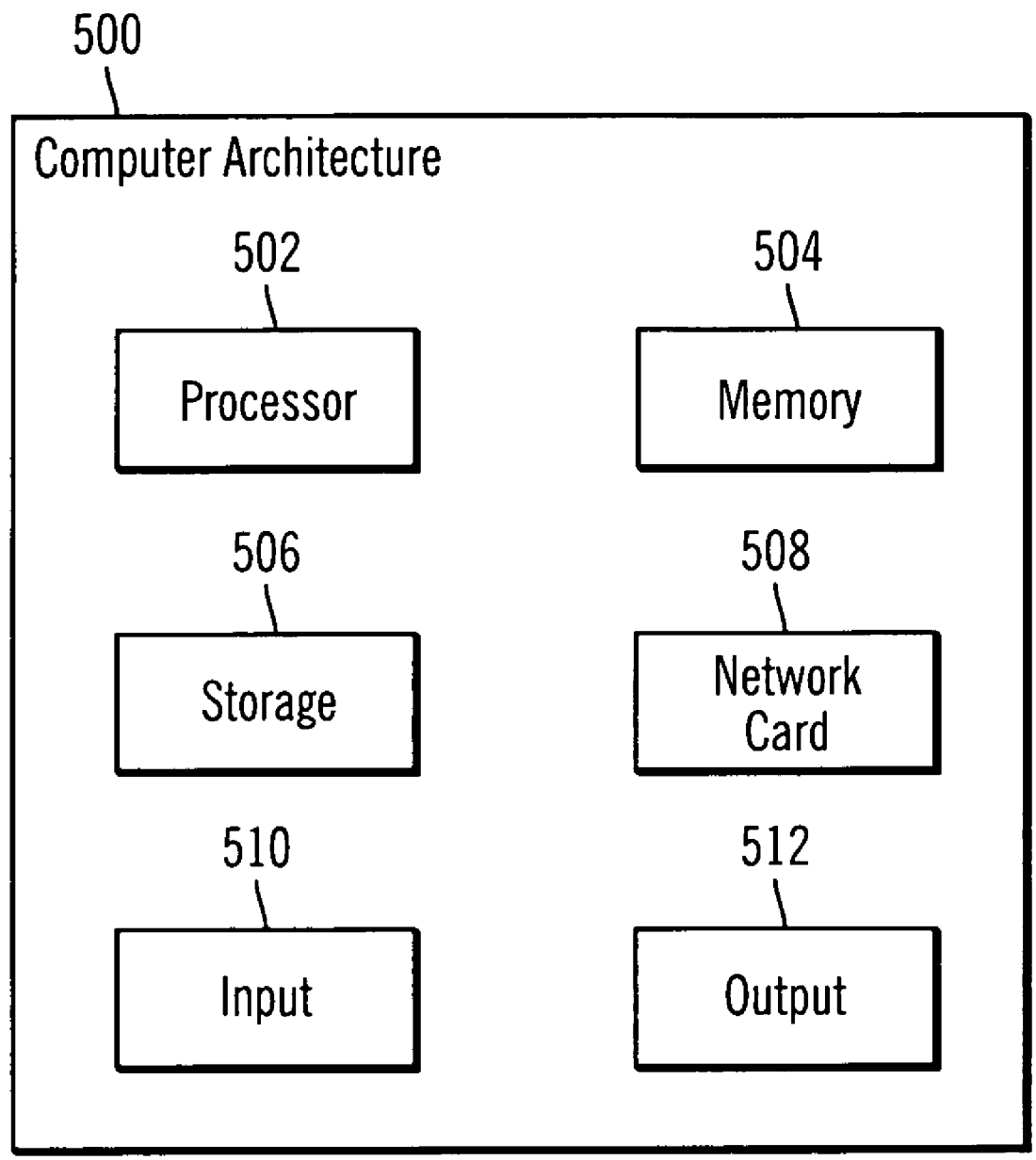
FIG. 5 illustrates a computing architecture in which certain embodiments are implemented.

FIG. 5 illustrates a block diagram of a computer architecture in which certain embodiments are implemented. FIG. 5 illustrates one embodiment of the host 106, and the first and second storage control units 100, 102. The host 106 and the storage control units 100, 102 may implement a computer architecture 500 having a processor 502, a memory 504 (e.g., a volatile memory device), and storage 506. Not all elements of the computer architecture 500 may be found in the host 106 and the storage control units 100, 102. The storage 506 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 506 may comprise an internal storage device, an attached storage device and/or a network accessible storage device. Programs in the storage 506 may be loaded into the memory 504 and executed by the processor 502 in a manner known in the art. The architecture may further include a network card 508 to enable communication with a network. The architecture may also include at least one input device 510, such as a keyboard, a touchscreen, a pen, voice-activated input, etc., and at least one output device 512, such as a display device, a speaker, a printer, etc.

At least certain of the operations of FIG. 4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1–5 are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method for copying data, comprising:

receiving, from a host, a request including an indicator at a first storage control unit having a first set of volumes, wherein the first storage control unit is coupled via a link to a second storage control unit having a second set of volumes that are peer-to-peer copies of the first set of volumes, and wherein the second storage control unit does not have an active link for receiving commands from a device other than the first storage control unit;

determining, by processing the indicator included in the request, at the first storage control unit, whether to transmit a command from the first storage control unit to the second storage control unit to generate a copy of the second set of volumes to a third set of volumes at the second storage control unit;

transmitting the command, via the link, from the first storage control unit to the second storage control unit, in response to determining by processing the indicator that the command is to be transmitted, to the second storage control unit;

copying, at the second storage control unit, the second set of volumes to the third set of volumes, in response to receiving the transmitted command at the second storage control unit from the first storage control unit; and performing operations at the first storage control unit, and not transmitting the command from the first storage control unit to the second storage control unit to generate a copy of the second set of volumes to the third set of volumes at the second storage control unit, in response to determining by processing the indicator that the command is not to be transmitted, to the second storage control unit.

2. The method of claim 1, wherein the indicator is a flag, wherein processing the indicator further comprises determining whether the flag is set to on, and wherein if the flag is set to on then the command is to be transmitted from the first storage unit to the second storage control unit.

3. The method of claim 2, wherein on completion of the copying, at the second storage control unit, of the second set of volumes to the third set of volumes, data in the first set of volumes is consistent at a point in time with data in both the second set of volumes and the third set of volumes.

4. The method of claim 3, wherein copying the second set of volumes to the third set of volumes is performed by a point-in-time copy operation.

5. The method of claim 2, wherein the second set of volumes that are peer-to-peer copies of the first set of volumes are generated synchronously from the first set of volumes, and wherein the data in the first set of volumes is consistent with the data in the second set of volumes.

6. The method of claim 2, wherein the request is a command for point-in-time copying of data the method further comprising:
signalling the host that the copying, at the second storage control unit, of the second set of volumes to the third set of volumes has been completed.

7. A system for copying data, comprising:
a first storage control unit;
a second storage control unit;
a link coupling the first storage control unit to the second storage control unit;
a host coupled to the first storage control unit;
means for receiving, from the host, a request including an indicator at the first storage control unit having a first set of volumes, wherein the second storage control unit has a second set of volumes that are peer-to-peer copies of the first set of volumes, and wherein the second storage control unit does not have an active link for receiving commands from a device other than the first storage control unit;
means for determining, by processing the indicator included in the request, at the first storage control unit, whether to transmit a command from the first storage control unit to the second storage control unit to generate a copy of the second set of volumes to a third set of volumes at the second storage control unit;
means for transmitting the command, via the link, from the first storage control unit to the second storage control unit, in response to determining by processing the indicator that the command is to be transmitted, to the second storage control unit;
means for copying, at the second storage control unit, the second set of volumes to the third set of volumes, in response to receiving the transmitted command at the second storage control unit from the first storage control unit; and
means for performing operations at the first storage control unit, and not transmitting the command from the first storage control unit to the second storage control unit to generate a copy of the second set of volumes to the third set of volumes at the second storage control unit, in response to determining by processing the indicator that the command is not to be transmitted, to the second storage control unit.

8. The system of claim 7, wherein the indicator is a flag, wherein processing the indicator further comprises determining whether the flag is set to on, and wherein if the flag is set to on then the command is to be transmitted from the first storage unit to the second storage control unit.

9. The system of claim 8, wherein on completion of the copying, at the second storage control unit, of the second set of volumes to the third set of volumes, data in the first set of volumes is consistent at a point in time with data in both the second set of volumes and the third set of volumes.

10. The system of claim 9, wherein copying the second set of volumes to the third set of volumes is performed by a point-in-time copy operation.

11. The system of claim 8, wherein the second set of volumes that are peer-to-peer copies of the first set of volumes are generated synchronously from the first set of volumes, and wherein the data in the first set of volumes is consistent with the data in the second set of volumes.

12. The system of claim 8, wherein the request is a command for point-in-time copying of data, the system further comprising:
means for signalling the host that the copying, at the second storage control unit, of the second set of volumes to the third set of volumes has been completed.

13. A article of manufacture comprising a computer readable storage medium for copying data, wherein the article of manufacture is capable of causing operations on at least a first storage control unit coupled to a host, the operations comprising:
receiving, from the host, a request including an indicator at the first storage control unit having a first set of volumes, wherein the first storage control unit is coupled via a link to a second storage control unit having a second set of volumes that are peer-to-peer copies of the first set of volumes, and wherein the second storage control unit does not have an active link for receiving commands from a device other than the first storage control unit;
determining, by processing the indicator included in the request, at the first storage control unit, whether to transmit a command from the first storage control unit to the second storage control unit to generate a copy of the second set of volumes to a third set of volumes at the second storage control unit;
transmitting the command, via the link, from the first storage control unit to the second storage control unit, in response to determining by processing the indicator that the command is to be transmitted, to the second storage control unit;
copying, at the second storage control unit, the second set of volumes to the third set of volumes, in response to receiving the transmitted command at the second storage control unit from the first storage control unit; and
performing execution of instructions at the first storage control unit, and not transmitting the command from the first storage control unit to the second storage control unit to generate a copy of the second set of volumes to the third set of volumes at the second storage control unit, in response to determining by processing the indicator that the command is not to be transmitted, to the second storage control unit.

14. The article of manufacture of claim 13, wherein on completion of the copying, at the second storage control unit, of the second set of volumes to the third set of volumes, data in the first set of volumes is consistent at a point in time with data in both the second set of volumes and the third set of volumes.

15. The article of manufacture of claim 14, wherein on completion of the copying, at the second storage control unit, of the second set of volumes to the third set of volumes, data in the first set of volumes is consistent at a point in time with data in both the second set of volumes and the third set of volumes.

16. The article of manufacture of claim 15, wherein copying the second set of volumes to the third set of volumes is performed by a point-in-time copy operation.

17. The article of manufacture of claim 14, wherein the second set of volumes that are peer-to-peer copies of the first set of volumes are generated synchronously from the first set of volumes, and wherein the data in the first set of volumes is consistent with the data in the second set of volumes.

18. The article of manufacture of claim 14, wherein the request is a command for point-in-time copying of data, the operations further comprising:

signalling the host that the copying, at the second storage control unit, of the second set of volumes to the third set of volumes has been completed.

* * * * *